United States Patent
Osada (10) Patent No.: US 11,236,994 B2
(45) Date of Patent: Feb. 1, 2022

(54) APPEARANCE INSPECTION DEVICE OF CRIMP TERMINAL

(71) Applicant: Yazaki Corporation, Tokyo (JP)

(72) Inventor: Tatsuo Osada, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 17/020,058

(22) Filed: Sep. 14, 2020

(65) Prior Publication Data

US 2021/0088326 A1 Mar. 25, 2021

(30) Foreign Application Priority Data

Sep. 20, 2019 (JP) .............................. JP2019-172041

(51) Int. Cl.
| | |
|---|---|
| *G01B 11/24* | (2006.01) |
| *G01N 21/952* | (2006.01) |
| *H01R 43/048* | (2006.01) |

(52) U.S. Cl.
CPC ........... *G01B 11/24* (2013.01); *G01N 21/952* (2013.01); *H01R 43/048* (2013.01)

(58) Field of Classification Search
CPC ..... G01B 11/30; G01B 11/303; G01B 11/306; G01B 11/24; G01N 21/952; G01N 21/8806; G01N 21/88; H01R 43/048
See application file for complete search history.

(56) References Cited

U.S. PATENT DOCUMENTS

| | | | | |
|---|---|---|---|---|
| 4,443,706 A | * | 4/1984 | DiMatteo | G01B 11/24 250/558 |
| 5,619,792 A | * | 4/1997 | Ohmori | G01B 11/00 29/721 |
| 5,691,763 A | * | 11/1997 | Ichikawa | G01N 21/8806 348/125 |
| 6,369,879 B1 | * | 4/2002 | Pedersen | G01B 11/24 356/3.01 |
| 6,504,605 B1 | * | 1/2003 | Pedersen | G01B 11/24 356/141.1 |
| 2015/0253129 A1 | * | 9/2015 | Ohnishi | G01N 21/8806 348/87 |
| 2020/0134773 A1 | * | 4/2020 | Pinter | G06T 7/521 |

FOREIGN PATENT DOCUMENTS

JP H08-178851 A 7/1996

* cited by examiner

*Primary Examiner* — Shawn Decenzo
*Assistant Examiner* — Jarreas C Underwood
(74) *Attorney, Agent, or Firm* — Banner & Witcoff, Ltd.

(57) ABSTRACT

The appearance inspection device inspects an appearance of a crimp terminal by capturing an image of the crimp terminal with a camera while applying illumination light onto the crimp terminal. The device includes an illumination unit for applying illumination light onto a crimp terminal and cameras that capture an image of the crimp terminal. A planar gradation light source having brightness that gradually changes in a predetermined direction from one side on an illumination surface toward another side is provided as the illumination unit. The cameras are disposed such that the gradation light source is reflected on an image obtained by the camera capturing the image of the crimp terminal, as a reflected image on a surface of the crimp terminal.

4 Claims, 10 Drawing Sheets

POSITION IN DIRECTION FAR FROM TOP OF TERMINAL

NORMAL · FAIR-QUALITY

FIG. 9B

BRIGHT · BENT OUTWARD DEFECTIVE

FIG. 9C

DARK · BENT INWARD DEFECTIVE

FIG. 10

APPEARANCE INSPECTION DEVICE OF CRIMP TERMINAL

CROSS REFERENCE TO RELATED APPLICATIONS

This application is based on and claims priority from Japanese patent application No. 2019-172041 filed on Sep. 20, 2019, the entire contents of which are incorporated herein by reference.

TECHNICAL FIELD

The present invention relates to an appearance inspection device of a crimp terminal, which inspects an appearance by capturing an image of the appearance with a camera while applying illumination light onto a crimp terminal crimped on a tip of an electric wire.

BACKGROUND ART

In the related art, an appearance inspection device of this type is known in Patent Document 1 and the like. An appearance inspection device disclosed in Patent Document 1 is configured such that illumination light is applied onto a crimp terminal as uniformly as possible.

CITATION LIST

Patent Literature

[Patent Document 1] JP-A-H8-178851

However, since the illumination light is set to be uniformly applied onto the crimp terminal, there is a problem that it is difficult to check a deformed state of a terminal, such as a gentle unevenness. In addition, if the entire lighting is bright, there is a problem that halation occurs depending on the deformed state of the terminal, and thus it is difficult to check a deformed portion.

SUMMARY OF INVENTION

The present invention has been made in view of the above circumstances, and an object thereof is to provide an appearance inspection device of a crimp terminal, which is capable of detecting a deformed state of the crimp terminal.

According to an embodiment, an appearance inspection device of a crimp terminal inspects an appearance by capturing an image of the appearance with a camera while applying illumination light onto a crimp terminal crimped on a tip of an electric wire. The device comprises:

a terminal set unit that is set at a fixed position by an image capturing space;

an illumination unit for applying illumination light onto the crimp terminal disposed on the terminal set unit in a predetermined direction; and a camera that captures an image of the crimp terminal disposed on the terminal set unit in a predetermined direction, wherein a planar gradation light source having brightness that gradually changes from one side on an illumination surface toward another side is provided as the illumination unit, and the camera is disposed at a position at which the gradation light source appears, as a reflected image on a surface of the crimp terminal, on an image obtained by the camera capturing the image of the crimp terminal.

BRIEF DESCRIPTION OF DRAWINGS

FIGS. 5A and 5B are diagrams illustrating gradation of brightness of an illumination surface of a light diffusion plate in the appearance inspection device.

FIGS. 9A to 9C are pictures showing a difference in brightness of the stabilizer portion (location indicated by N) on an acquired image, by the deformation state of the stabilizer that protrudes toward a lower surface of the crimp terminal in the appearance inspection device;

DESCRIPTION OF EMBODIMENTS

Specific embodiments of the present invention will be described below with reference to the drawings.

Figure 1:
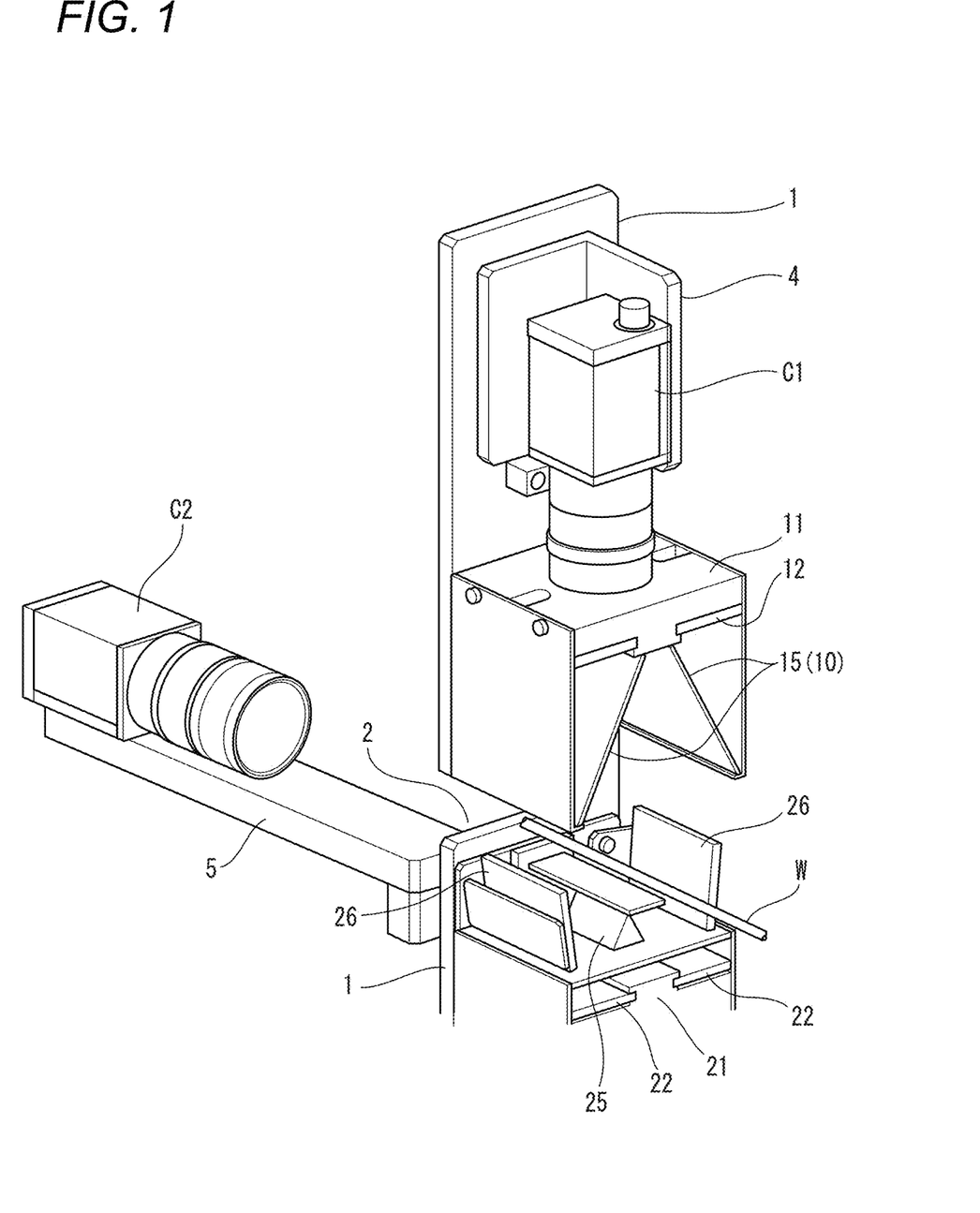
FIG. 1 is a perspective view illustrating some components of an appearance inspection device according to an embodiment of the present invention.
Figure 2:
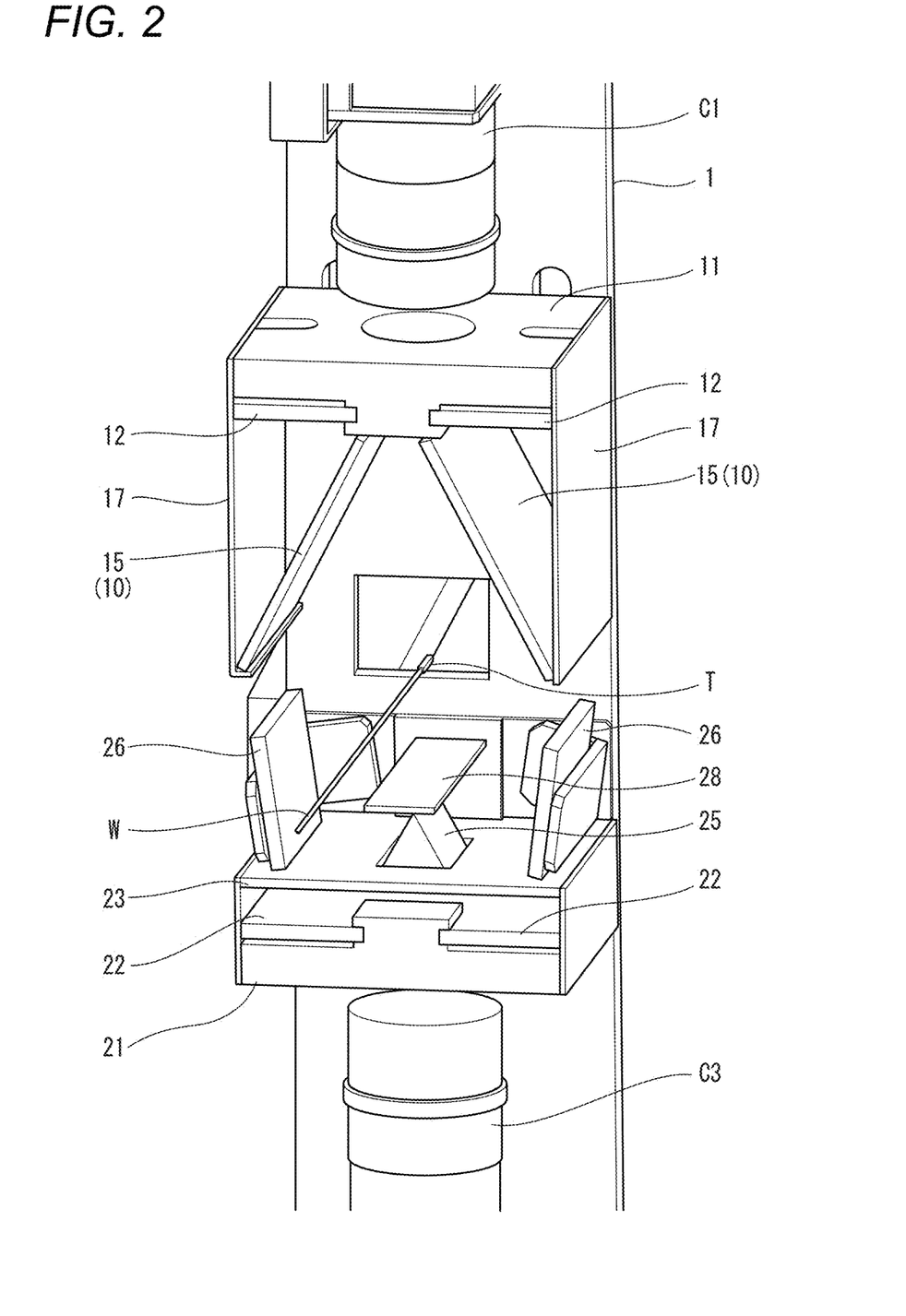
FIG. 2 is a perspective view when the components of the appearance inspection device are viewed from a direction different from a direction in FIG. 1.
Figure 3:
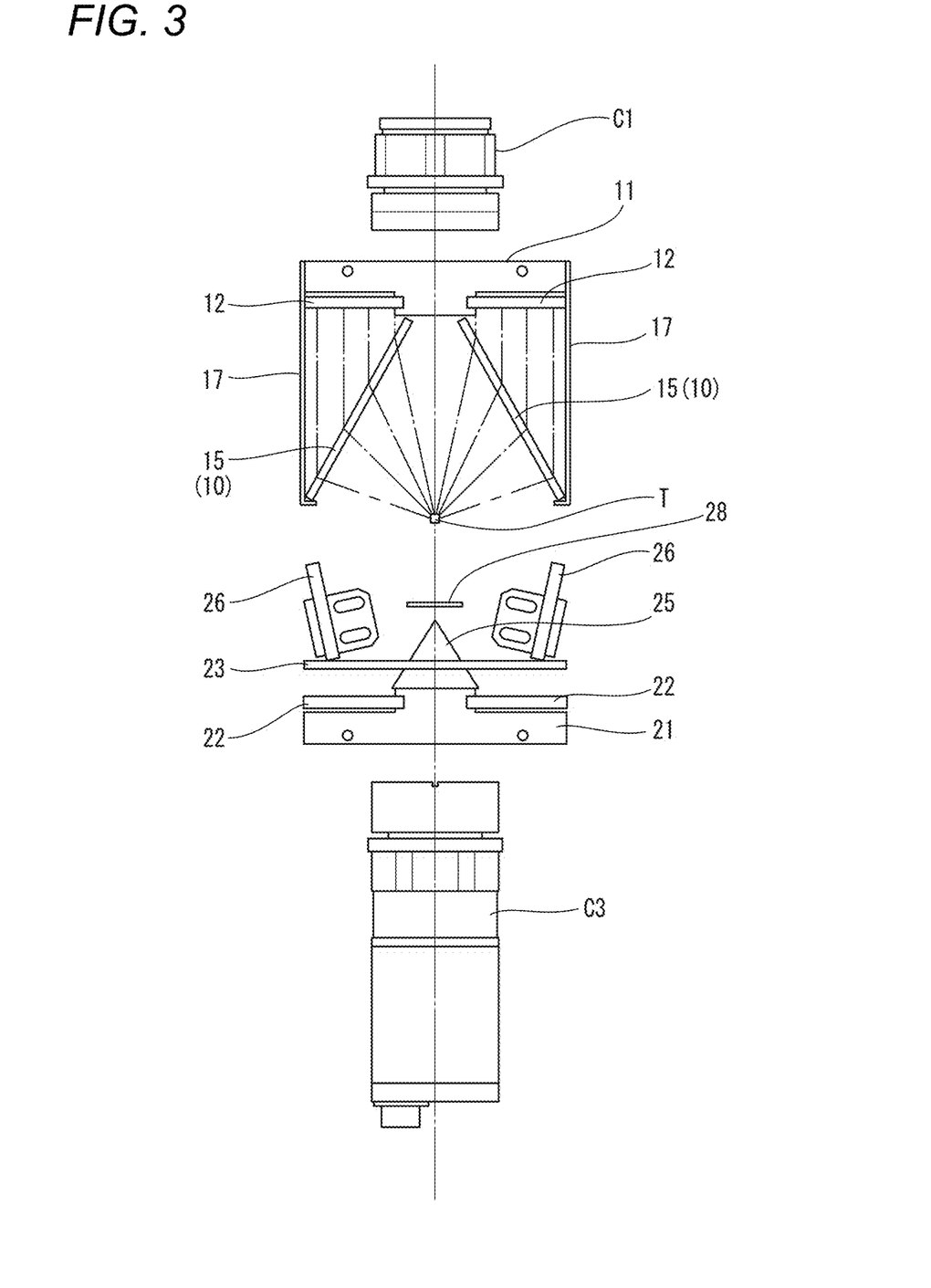
FIG. 3 is a schematic configuration diagram when the appearance inspection device is viewed from the rear.
Figure 4:
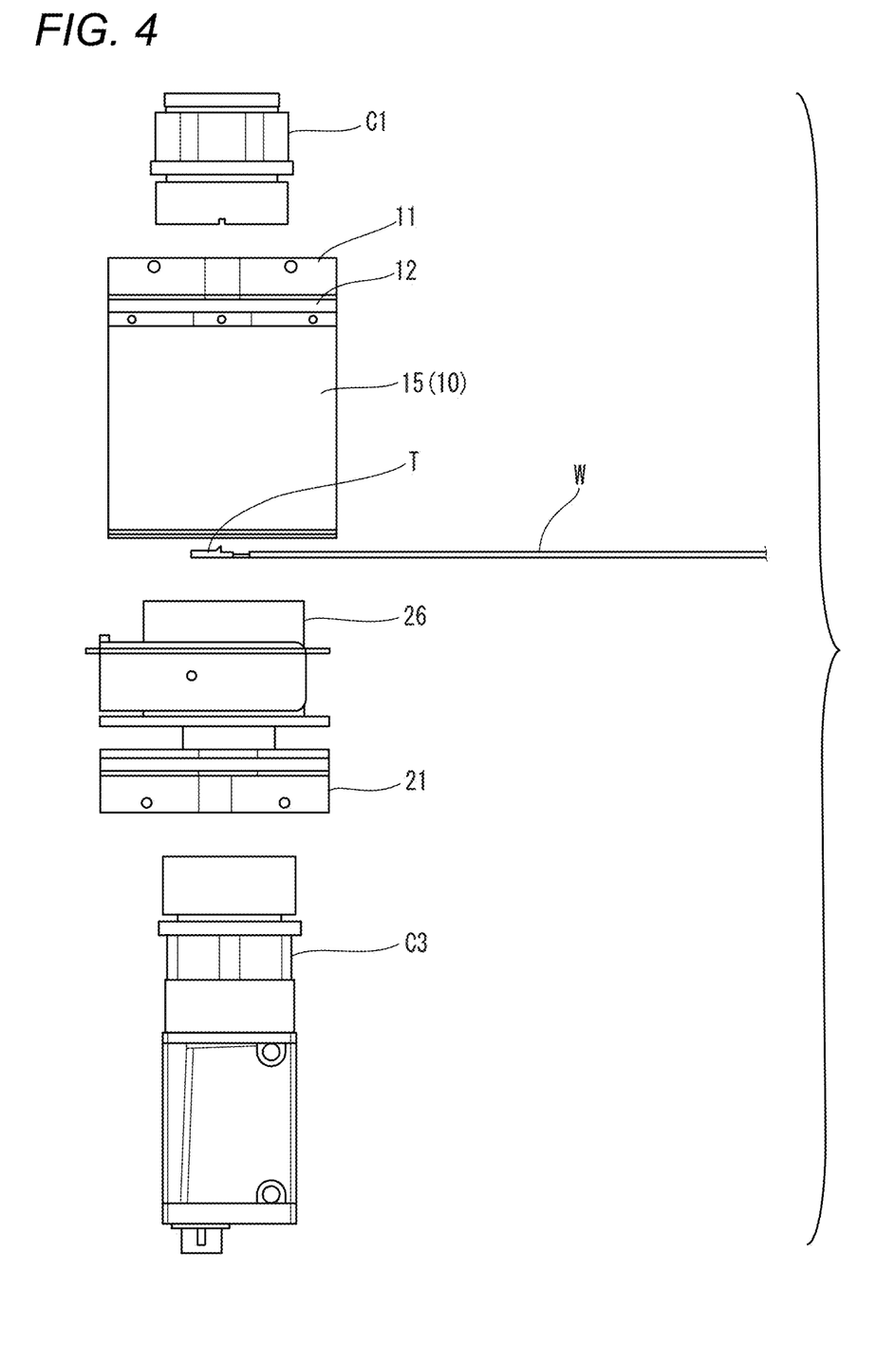
FIG. 4 is a schematic configuration diagram when the appearance inspection device is viewed from the side.

FIG. 1 is a perspective view illustrating some components of an appearance inspection device according to an embodiment of the present invention. FIG. 2 is a perspective view when viewed from a direction different from a direction in FIG. 1. FIG. 3 is a schematic configuration diagram when the appearance inspection device is viewed from the rear. FIG. 4 is a schematic configuration diagram when the appearance inspection device is viewed from the side.

As illustrated in FIGS. 1 to 4, according to an embodiment, an appearance inspection device inspects an appearance by capturing an image of a crimp terminal T crimped on the tip of an electric wire W, with cameras C1, C2, and C3 while applying illumination light.

A terminal set unit is provided at a fixed position of an image capturing space by the cameras C1 to C3. In the embodiment, a state where the crimp terminal T is disposed on the terminal set unit will be described. Thus, FIGS. 1 to 4 illustrate the crimp terminal T instead of the terminal set unit. The terminal set unit is provided at the center of the image capturing space by the cameras C1 to C3.

The crimp terminal T is inserted and set into the terminal set unit at a posture at which the front end of the crimp terminal T is directed toward the front, the upper surface of the electric-wire caulked portion of the crimp terminal T is directed upward, an extension direction of the electric wire W connected to the crimp terminal T is directed rearward, and the right and left side surfaces of the crimp terminal T are directed to the right and left sides. The crimp terminal T connected by being crimped on the tip of the electric wire W is inserted and set into the terminal set unit, for example, in a horizontal direction (right-left direction) perpendicular to an extension direction of the electric wire W, or from the rear to the front in a direction parallel to the extension direction of the electric wire W.

Upper illumination unit and lower illumination unit are provided in the appearance inspection device, as the illumination unit for applying illumination light onto the crimp terminal T disposed on the terminal set unit in a predetermined direction. The upper illumination unit is located above the crimp terminal T disposed on the terminal set unit. The lower illumination unit is located under the crimp terminal T disposed on the terminal set unit.

As components of the upper illumination unit, a flat light source 12 in which multiple LEDs are arranged, a light diffusion plate 15 made of a white translucent resin thin plate, and a reflection plate 17 in which an inner surface is set to a mirror surface are provided. An LED type lower flat light source 22 is provided as the lower illumination unit. The upper illumination unit is supported by an upper support plate 11, and the lower illumination unit is supported by a lower support plate 21. The upper support plate 11 and the lower support plate 21 are attached to a vertical base plate 1. The upper support plate 11 is located above the image capturing space and is fixed. The lower support plate 21 is located under the image capturing space and is fixed.

Three cameras of the upper camera C1, the front camera C2, and the lower camera C3 are provided to be fixed in the appearance inspection device, as cameras that captures images of the crimp terminal T disposed on the terminal set unit in predetermined directions. The cameras C1 to C3 are also attached to the vertical base plate 1 through brackets 4 and 5, and the like.

The upper camera C1 is disposed over the top of the terminal set unit (crimp terminal T), and captures an upper surface image of the crimp terminal T disposed on the terminal set unit from the top. The front camera C2 is disposed on the front of the terminal set unit (crimp terminal T) and captures an image of the crimp terminal T disposed on the terminal set unit from the front. The front camera C2 is provided to check the inclination of the inserted crimp terminal T.

The lower camera C3 is disposed under the bottom of the terminal set unit (crimp terminal T) and captures images of right and left side surfaces of the crimp terminal T disposed on the terminal set unit from a diagonally-lower portion through a prism 25 and reflectors 26. Thus, the lower camera C3, the prism 25 disposed above the lower camera C3 and under the bottom of the crimp terminal T disposed on the terminal set unit, and the reflectors 26 that are disposed on the right and left of the prism 25 and receive optical images of the right and left side surfaces of the diagonally-lower portion of the crimp terminal T disposed on the terminal set unit, at the diagonally-downward right and left positions of the crimp terminal T, and cause the received optical images to be incident to a lens of the lower camera C3 through the prism 25 are included in a side camera that captures images of right and left side surfaces of the crimp terminal T from the diagonally-lower portion.

The prism 25 is installed on the lower support plate 21. The reflector 26 is installed on a translucent plate 23 above the lower flat light source 22 attached to the lower support plate 21. A plate 28 is disposed above the prism 25 to prevent the reflection of the lower components when the upper camera C1 captures an image.

The upper illumination unit 10 is provided as a planar gradation light source (corresponding to the light diffusion plate 15 described later) having brightness that gradually changes from one side on the illumination surface toward the other side in a predetermined direction. A pair of the planar gradation light sources (light diffusion plates 15) are disposed at positions diagonally above on the right and left sides to avoid the top of the terminal set unit as an image capturing optical path of the upper camera C1, at a posture at which a flat illumination surface is parallel to an axial direction of the crimp terminal T.

In each of the right and left gradation light sources (light diffusion plates 15), a gradation direction is set such that the brightness of each illumination surface gradually changes in a right-left direction while the brightness in a direction parallel to the axial direction of the crimp terminal is maintained to have a predetermined value.

More specifically, a pair of flat light sources 12 are disposed on both the right and left sides of the terminal set unit on the top such that the illumination surface is directed downward. The flat light source 12 performs irradiation with uniform light downward. The light diffusion plate 15 is disposed under each flat light source 12 such that a plate surface is directed in a direction parallel to the axial direction of the crimp terminal T disposed on the terminal set unit. The pair of light diffusion plates 15 are inclined downward while becoming farther from the position close to the top of the terminal set unit in the right-left direction, and transmit light from the flat light source 12 while diffusing the light. That is, the pair of light diffusion plates 15 are installed in an inverse V shape when viewed from the front or the rear.

Thus, the light diffusion plate 15 functions as a gradation illumination surface having brightness that changes depending on a change in distance from the flat light source 12 in the right-left direction. Here, since a distance between the light diffusion plate 15 and the flat light source 12 increases with becoming farther from a side close to the top of the crimp terminal T in the right-left direction, the light diffusion plate 15 has gradation of the brightness that decreases from the center side close to the top of the crimp terminal T to the right and left outsides. Since the light from the flat light source 12 is transmitted with being diffused by the light diffusion plate 15 made of a white translucent resin thin plate, it is possible to widen a light emitting surface and reduce local uneven brightness. The reflection plate 17 for keeping the light of the flat light source 12 in the image capturing space without leaking the light to the outside is disposed outside each light diffusion plate 15.

The upper camera C1 and the side camera (lower camera C3, prism 25, and reflectors 26) are disposed such that a gradation light source (light diffusion plate 15) is reflected on an image obtained by the camera capturing the image of the crimp terminal T, as a reflected image on the surface of the crimp terminal T.

Next, the effects will be described.

Figure 5A:
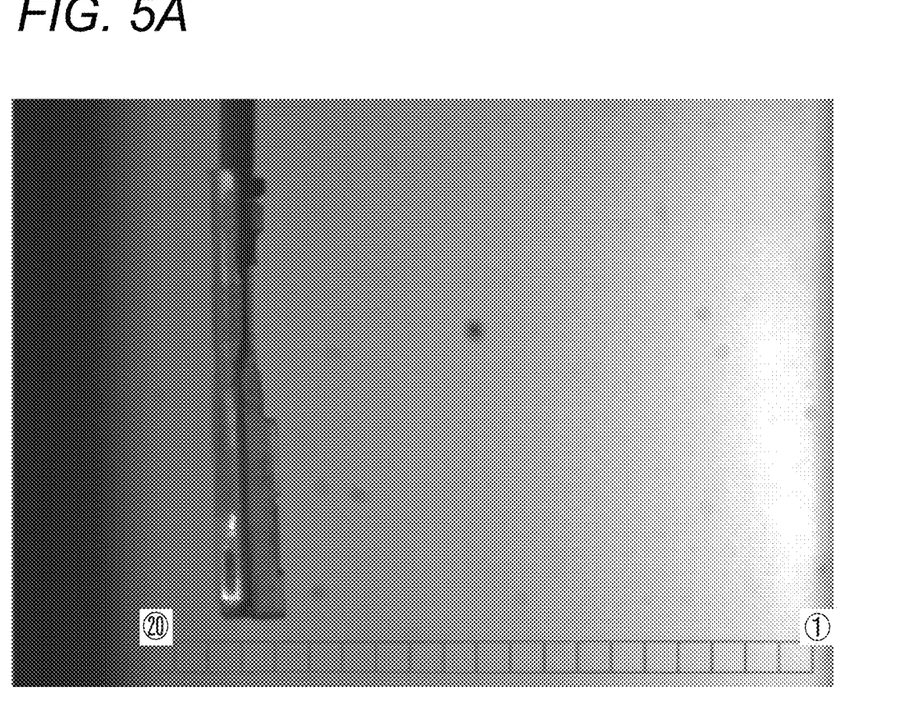
FIG. 5A is a picture showing the illumination surface of the light diffusion plate.
Figure 5B:
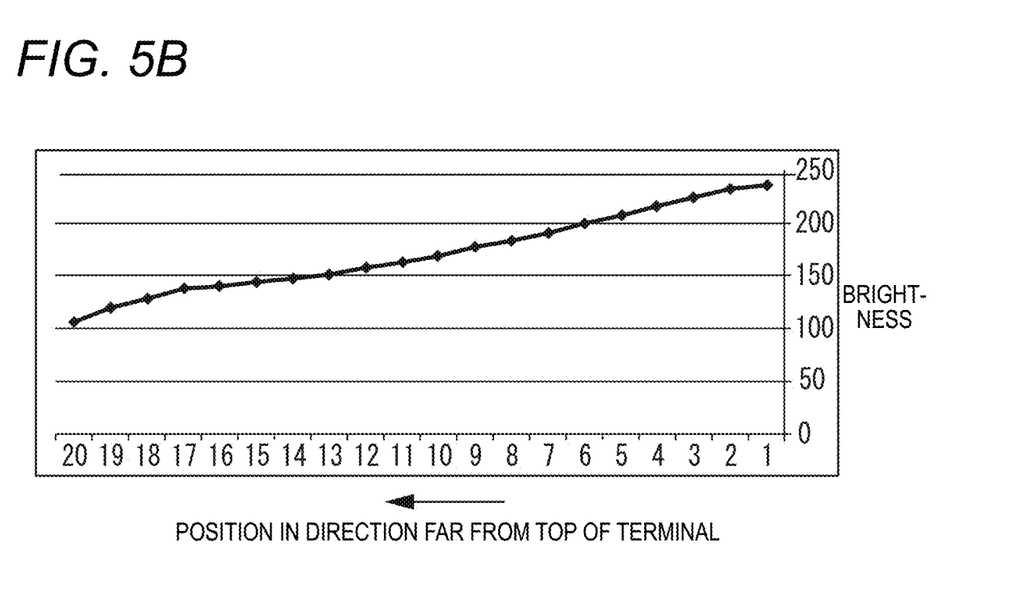
FIG. 5B is a graph illustrating a change of the brightness depending on a position in a direction far from the top of a terminal.
Figure 6:
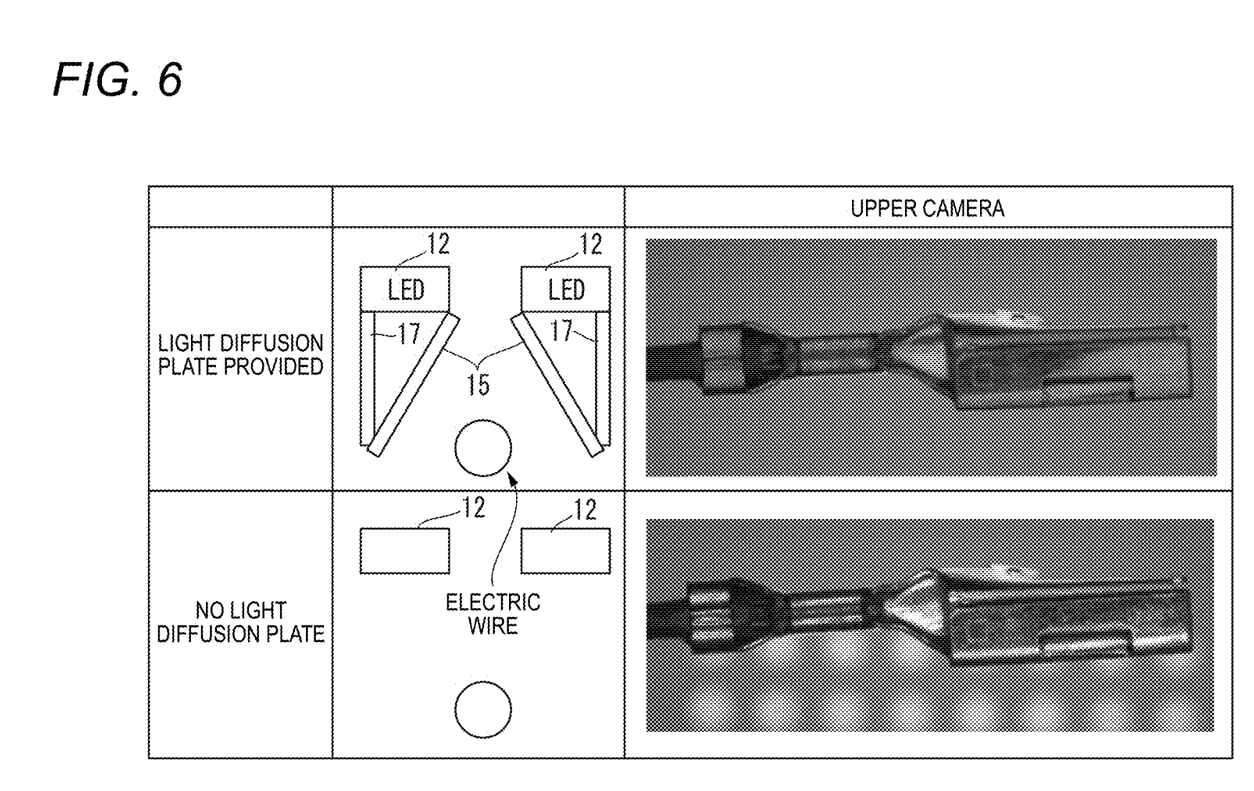
FIG. 6 is a diagram illustrating a difference in halation on the surface of a crimp terminal and a difference in visibility of an image, depending on whether the light diffusion plate is provided in the appearance inspection device.
Figure 7:
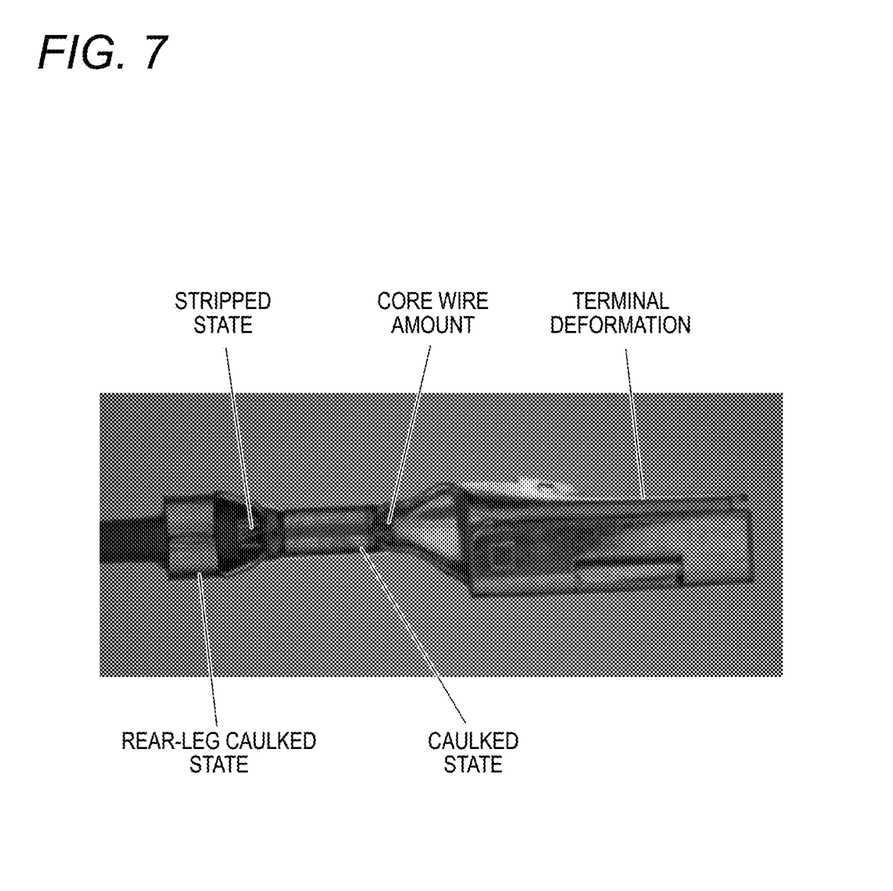
FIG. 7 is a diagram illustrating inspection items in the appearance inspection device.

FIGS. 5A and 5B are diagrams illustrating the gradation of the brightness of the illumination surface of the light diffusion plate 15 in the appearance inspection device according to the embodiment. FIG. 5A is a picture showing the illumination surface of the light diffusion plate 15. FIG. 5B is a graph illustrating a change of the brightness depending on a position in a direction far from the top of the crimp terminal. FIG. 6 is a diagram illustrating a difference in halation on the surface of the crimp terminal and a difference in visibility of an image, depending on whether the light diffusion plate 15 is provided in the appearance inspection device. FIG. 7 is a diagram illustrating inspection items in the appearance inspection device.

As illustrated in FIGS. 5A and 5B, the light diffusion plate 15 receives light from the flat light source 12 and applies the illumination light onto the crimp terminal in the image capturing space, in a state where the brightness has gradation. Square rows arranged beside the lower end of the picture of FIG. 5A indicate measurement positions of the brightness. As illustrated in FIG. 5B, the brightness gradually decreases as the measurement position moves to the left from the center (right end in FIG. 5A). The illumination surface of the light diffusion plate 15 exhibits the function of the gradation light source by disposing the inclined light diffusion plate 15 under the flat light source 12, as described above.

As illustrated in FIG. 6, an image captured by the camera differs largely depending on whether or not the light diffusion plate 15 is provided. That is, when the light diffusion plate 15 is not provided, the contrast of the acquired image increases, and the halation occurs easily. When the light diffusion plate 15 is provided, the contrast of the acquired image decreases, the occurrence of the halation has difficulty, and thus the shape is easily recognized.

As inspection items of the appearance inspection device of the embodiment, as illustrated in FIG. 7, the terminal deformation, the stripped state of the electric wire, the exposed amount of the core wire, the caulked state of the crimped portion of the core wire, a rear-leg caulked state of a cover caulked portion, and the like are provided.

According to the appearance inspection device of the embodiment, it is possible to obtain effects as follows.

Firstly, in the appearance inspection device, the gradation light source (light diffusion plate 15) is reflected on an image obtained by the cameras C1 and C3 capturing the image of the crimp terminal T, as the reflected image on the surface of the crimp terminal T. The brightness of the illumination surface of the light source has gradation, that is, the brightness varies depending on a position on the illumination surface of the light source. Thus, when the crimp terminal T is deformed, the position of the gradation light source (light diffusion plate 15) to be reflected as the reflected image of the surface of the crimp terminal T, on the illumination surface, changes, and thereby the brightness of the reflected image obtained by capturing of the cameras C1 and C3 changes. Accordingly, it is possible to determine whether or not the crimp terminal T is deformed.

In particular, regarding the crimp terminal T such as a tin-plated terminal, which is a mirror-surface component that easily reflects light, since, if the shape of the product changes, the reflected position of the illumination surface of the light source on a product mirror surface by the cameras C1 and C3 changes, the brightness of the reflected image is easily changed. Thus, it is possible to detect the deformation of the terminal by such a change.

It is possible to distinguish a fair-quality product (without deformation) and a defective product (with deformation) from each other, for example, by a comparison of brightness between images of the fair-quality product and the defective product at the same locations. In addition, even though the posture of the crimp terminal itself as an inspection target is not stable, it is possible to relatively detect the deformation by recognizing a difference of brightness between two portions being a portion (comparison reference position) having a high possibility that the portion is deformed and a portion (deformation inspection target position) having a high possibility that the portion is not deformed. That is, when an image is acquired, brightness at two points in an area intended to check deformation on the surface of the terminal is calculated, and a difference of the brightness between the two points is greater or smaller than a reference value, it is possible to determine the product to be defective. In any case, it is possible to detect the deformation of the crimp terminal T from an image acquired by the cameras C1 and C3.

As described above, since an appearance inspection can be performed for the deformation state of the crimp terminal by the camera images, it is possible to perform the inspection without human intervention.

Specifically, it is possible to observe the state on the upper surface side of the crimp terminal T by the upper camera C1. It is possible to observe the states of the diagonally-lower right and left side surfaces of the crimp terminal T by the side camera (lower camera C3, prism 25, and reflectors 26). It is possible to improve determination accuracy more in a manner that the inclination of the crimp terminal T is measured by the front camera C2, and the determination value of the brightness of an image acquired by the upper camera C1 or the side camera varies depending on the decree of the inclination.

In this manner, for example, it is possible to observe the deformation state of the pair of stabilizers provided to protrude downward to lower surfaces of the crimp terminal on both right and left sides, for example. In particular, in the appearance inspection device according to the embodiment, a gradation direction of the brightness of the flat illumination surface of the light source is set to the right-left direction. Thus, it is possible to effectively observe the deformation in the right-left direction in that the stabilizer S is bent inward or outward.

Figure 8:
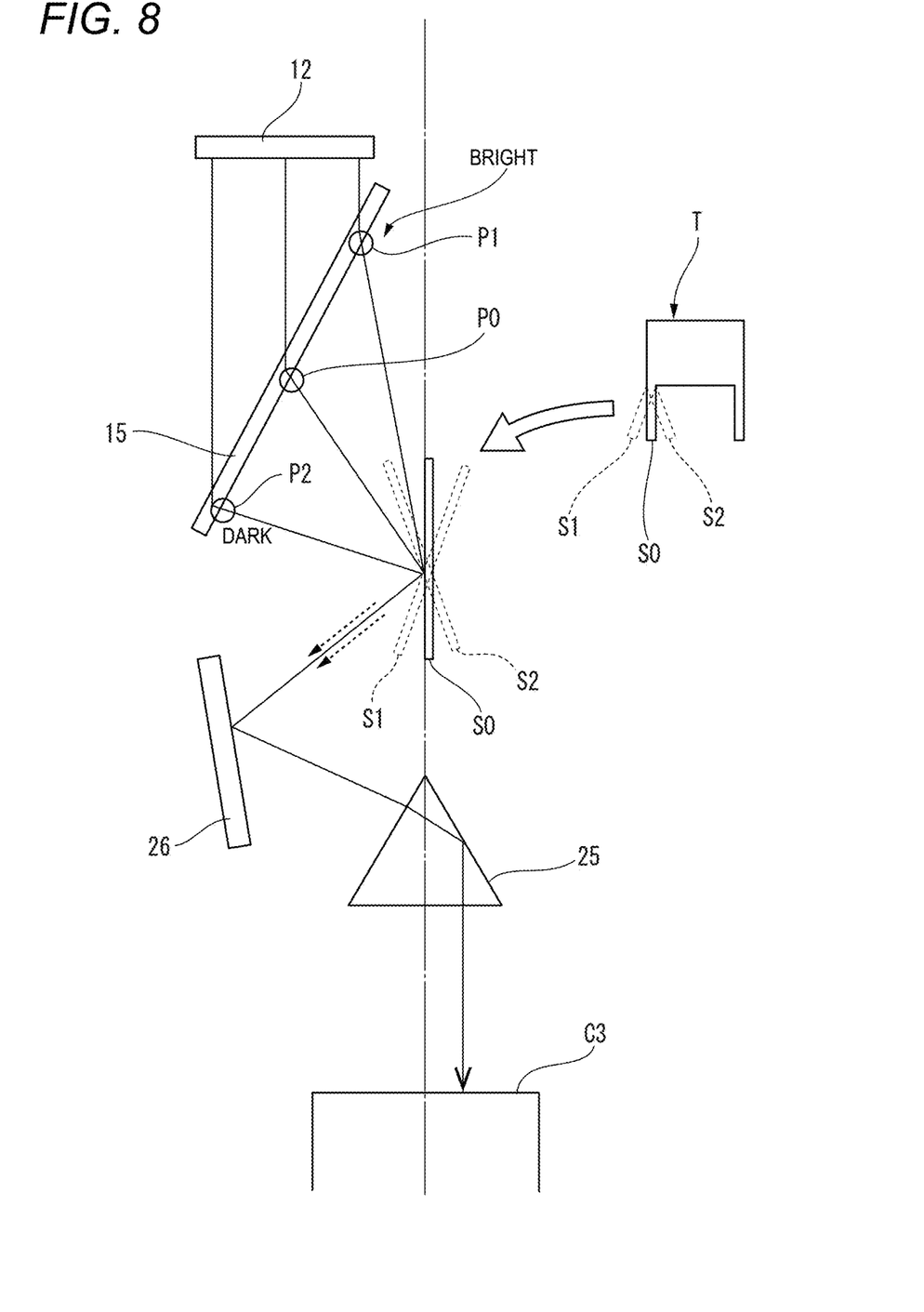
FIG. 8 is a schematic diagram illustrating a change of a reflection position of a gradation illumination surface (light diffusion plate) by a deformation state of a stabilizer on a lower surface of the crimp terminal in the appearance inspection device.
Figure 9A:
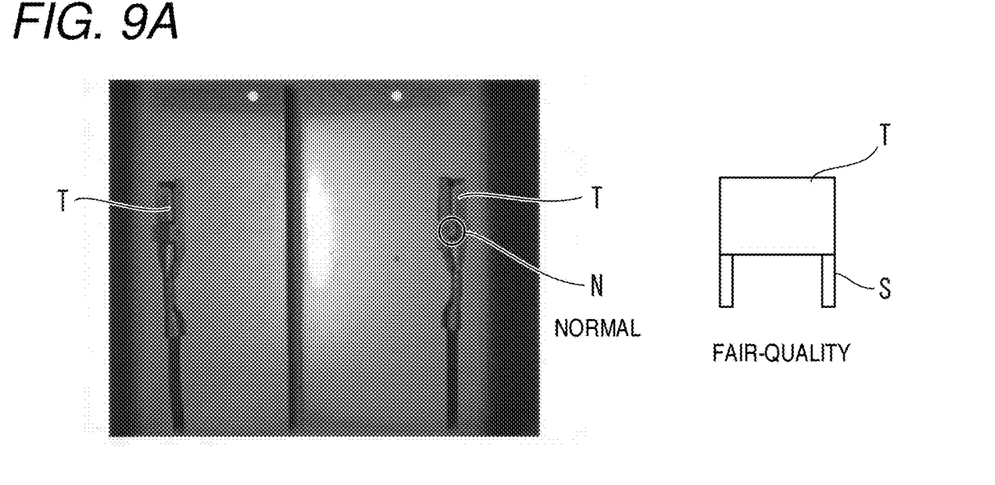
FIG. 9A is a picture showing a case where the stabilizer is a fair-quality product that is not bent.
Figure 9B:
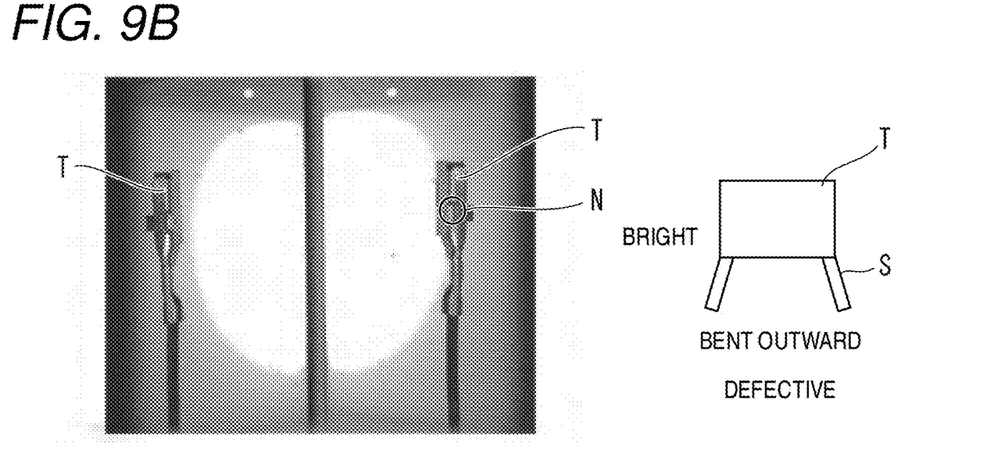
FIG. 9B is a picture showing a case where the stabilizer is a defective product that is bent outward.
Figure 9C:
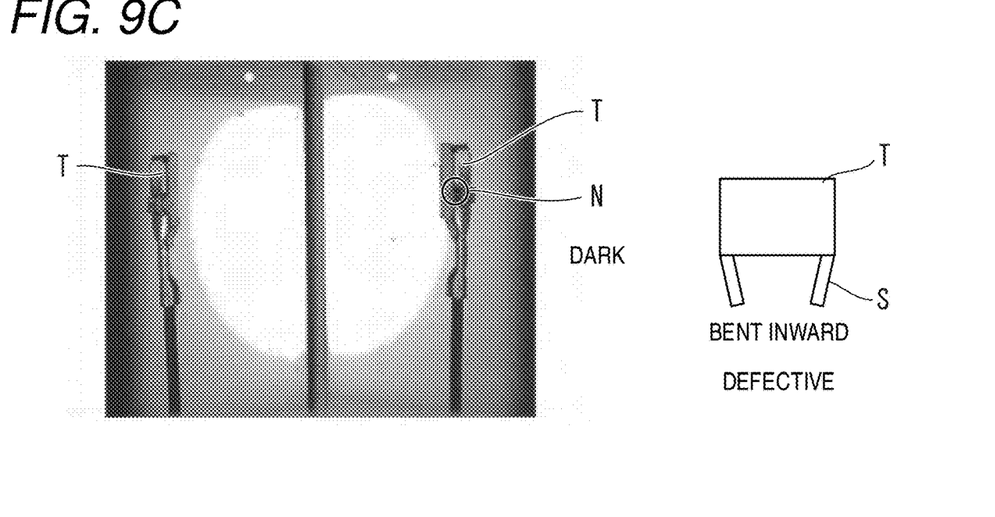
FIG. 9C is a picture illustrating a case where the stabilizer is a defective product that is bent inward.

FIG. 8 is a schematic diagram illustrating the change of a reflection position of the gradation illumination surface (light diffusion plate 15) by the deformation state of the stabilizer S on the lower surface of the crimp terminal T in the appearance inspection device. FIGS. 9A to 9C are pictures showing a difference in brightness of the stabilizer portion (location indicated by N) on an acquired image, by the deformation state of the stabilizer S that protrudes toward a lower surface of the crimp terminal T. FIG. 9A is a picture showing a case where the stabilizer S is a fair-quality product that is not bent. FIG. 9B is a picture showing a case where the stabilizer S is a defective product that is bent outward. FIG. 9C is a picture illustrating a case where the stabilizer S is a defective product that is bent inward.

As illustrated in FIG. 8, the light diffusion plate 15 (gradation light source) is reflected on an image obtained by the lower camera C3 capturing the image of the crimp terminal T, as the reflected image on the surface of the crimp terminal T. The brightness of the light diffusion plate 15 has gradation, that is, the brightness varies by positions (intermediate point P0, right-side point P1, and left-side point P2 in the right-left direction) of the light diffusion plate 15 in the right-left direction.

Thus, when the stabilizer S is deformed, the position of the light diffusion plate 15 to be reflected as the reflected image of the surface of the stabilizer S changes, and thus the brightness of the reflected image obtained by capturing of the camera C3 is changed. For example, in comparison to a case (S0 in FIG. 8) of the fair-quality product illustrated in FIG. 9A, when the stabilizer S is bent outward as illustrated in FIG. 9B (S1 in FIG. 8), the observation location N (position of the stabilizer S surrounded by a circle) becomes brighter. When the stabilizer S is bent inward as illustrated in FIG. 9C (S2 in FIG. 8), the observation location N (position of the stabilizer S surrounded by a circle) becomes darker. In this manner, it is possible to detect the deformation state of the stabilizer.

In the appearance inspection device of the embodiment, the gradation light source includes the flat light source 12 and the light diffusion plate 15 that is diagonally disposed. Thus, with the effect of the light diffusion plate 15, the crimp terminal T is irradiated with illumination light that is widely diffused. As a result, as illustrated in FIG. 6, it is possible to observe minute forms such as the unevenness or deformation of the surface of the crimp terminal T while suppressing halation due to illumination light.

In the appearance inspection device of the embodiment, it is possible to collectively acquire images of both right and left side surfaces of the crimp terminal T with one lower camera C3, the prism 25, and the right and left reflectors 26. Thus, equipment cost is reduced.

Figure 10:
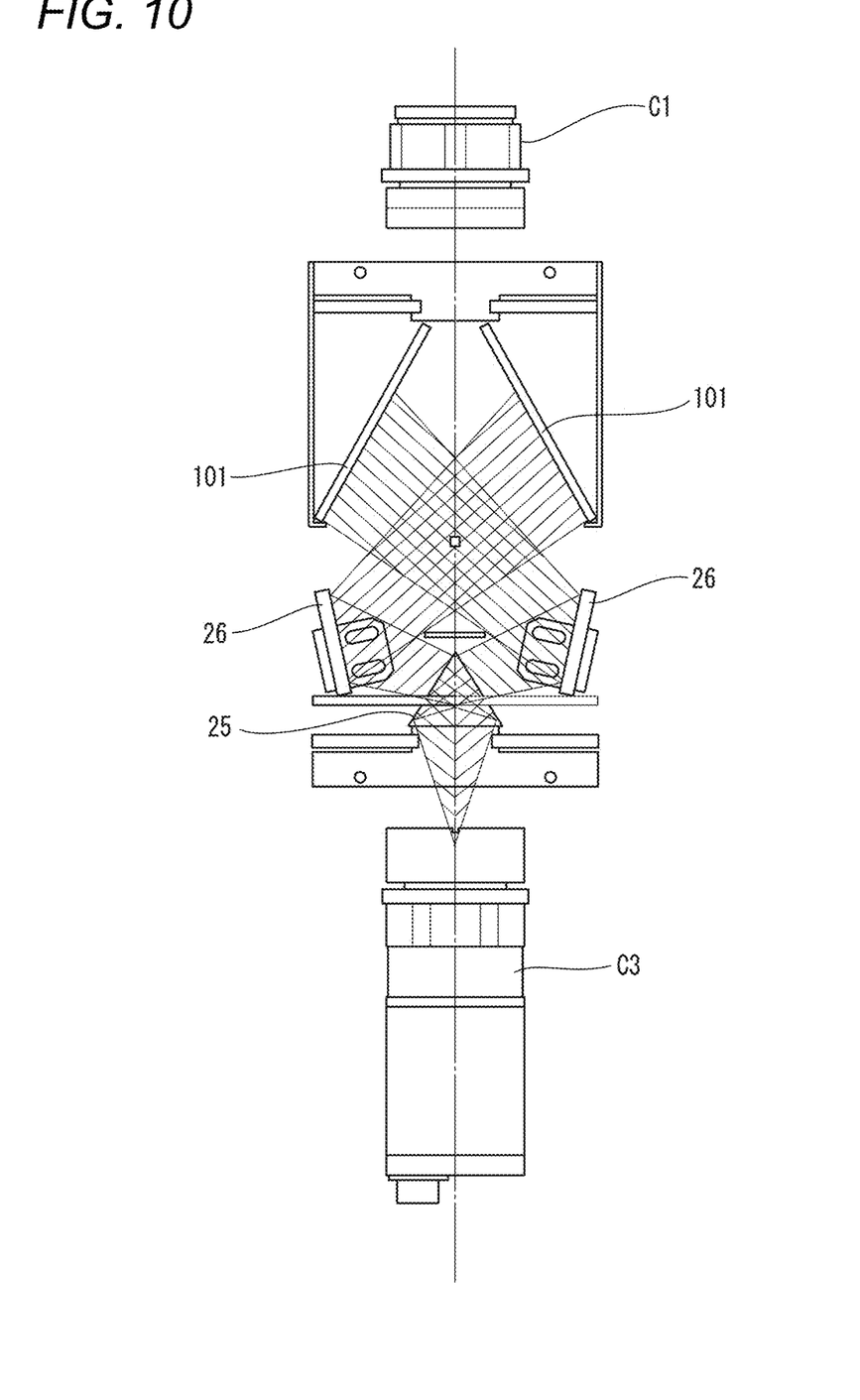
FIG. 10 is a diagram illustrating an appearance inspection device according to another embodiment of the present invention.

Another configuration may be adopted as the gradation light source located above the crimp terminal. FIG. 10 is a diagram illustrating an appearance inspection device according to another embodiment of the present invention.

In this device, the flat light source is not used, but a light source capable of gradation light emitting, for example, a liquid crystal display 101 is disposed instead of the light diffusion plate. As described above, it is also possible to use a device such as a liquid crystal panel or a projector, which is capable of controlling the light emission amount by itself, as well as a combination of the light diffusion plate 15 and the LED type flat light source 12.

[1] An appearance inspection device of a crimp terminal, which inspects an appearance by capturing an image of the appearance with a camera while applying illumination light onto a crimp terminal (T) crimped on a tip of an electric wire (W), the device including:

a terminal set unit (T) that is set at a fixed position of an image capturing space;

an illumination unit (10) for applying illumination light onto the crimp terminal (T) disposed on the terminal set unit in a predetermined direction; and a camera (C1, C3) that captures an image of the crimp terminal (T) disposed on the terminal set unit in a predetermined direction, in which a planar gradation light source (15) having brightness that gradually changes from one side on an illumination surface toward another side is provided as the illumination unit, and the camera (C1, C3) is disposed at a position at which the gradation light source (15) appears, as a reflected image on a surface of the crimp terminal (T), on an image obtained by the camera capturing the image of the crimp terminal (T).

According to the appearance inspection device of a crimp terminal with the configuration in [1] above, the gradation light source appears on an image obtained by the camera capturing the image of the crimp terminal, as a reflected image on the surface of the crimp terminal. The brightness of the illumination surface of the light source has gradation, that is, the brightness varies depending on a position on the illumination surface of the light source. Thus, when the crimp terminal is deformed, the position of the gradation light source to be reflected as a reflected image of the surface of the crimp terminal, on the illumination surface, changes, and thereby the brightness of the reflected image obtained by capturing of the camera changes. Accordingly, it is possible to determine whether or not the crimp terminal is deformed. In particular, regarding the crimp terminal such as a tin-plated terminal, which is a mirror-surface component that easily reflects light, since, if the shape of the product changes, the reflected position of the illumination surface of the light source on a product mirror surface captured by the camera changes, the brightness of the reflected image is easily changed. Thus, it is possible to detect the deformation of the terminal by such a change.

It is also possible to distinguish a fair-quality product (without deformation) and a defective product (with deformation) from each other by a comparison of brightness between images of the fair-quality product and the defective product at the same locations. It is also possible to relatively detect the deformation by recognizing a difference of brightness between two portions being a portion (comparison reference position) having a high possibility that the portion is deformed and a portion (deformation inspection target position) having a high possibility that the portion is not deformed. In any case, it is possible to detect the deformation of the crimp terminal from an image acquired by the camera.

[2] In the appearance inspection device of a crimp terminal, the terminal set unit may be set at the center of an image capturing space by the camera (C1, C3), and the crimp terminal is inserted and set at a posture at which a front end of the crimp terminal (T) is directed toward a front, an upper surface of an electric-wire caulked portion of the crimp terminal (T) is directed upward, and right and left side surfaces of the crimp terminal (T) are directed toward right and left sides, an upper camera (C1) that is disposed over the top of the terminal set unit and captures the image of the crimp terminal (T) disposed on the terminal set unit, from the top may be provided as the camera, a pair of the gradation light sources (15) may be disposed at positions diagonally above on the right and left sides to avoid the top of the terminal set unit as an image capturing optical path of the upper camera (C1), at a posture at which a flat illumination surface is parallel to an axial direction of the crimp terminal (T), and a gradation direction in each of the right and left gradation light sources (15) may be set such that the brightness of the illumination surface in each of the right and left gradation light sources (15) gradually changes in a right-left direction while the brightness in a direction parallel to the axial direction of the crimp terminal (T) is maintained to have a predetermined value.

According to the appearance inspection device of a crimp terminal with the configuration in [2] above, it is possible to observe the state of the upper surface side of the crimp terminal by the upper camera. Thus, it is possible to observe, for example, terminal deformation of the upper surface side of the crimp terminal, a stripped state of the electric wire, the exposed amount of a core wire, a caulked state of a crimped portion of the core wire, and a rear-leg caulked state of a cover caulked portion.

[3] In the appearance inspection device of a crimp terminal,
the right and left gradation light sources may include
flat light sources (12) disposed downward for the illumination surface on right and left sides of the top of the terminal set unit, and
light diffusion plates (15) that are disposed such that a flat surface is directed in the direction parallel to the axial direction of the crimp terminal (T) disposed on the terminal set unit, under the flat light source (12), are inclined downward while becoming farther to the right and left from a position close to the top of the terminal set unit, and transmit light from the flat light source (12) while diffusing the light, and
the light diffusion plate (15) functions as a gradation illumination surface having brightness that changes depending on a change in distance from the flat light source (12) in the right-left direction.

According to the appearance inspection device of a crimp terminal with the configuration in [3] above, the gradation light source includes the flat light source and the light diffusion plate that is diagonally disposed. Thus, with the effect of the light diffusion plate, the crimp terminal is irradiated with illumination light that is widely diffused. As a result, it is possible to observe minute forms such as the unevenness or deformation of the surface of the crimp terminal while suppressing halation due to illumination light.

[4] In the appearance inspection device of a crimp terminal,
a side camera that captures images of right and left side surfaces of the crimp terminal disposed on the terminal set unit from a diagonally-lower portion may further be provided as the camera,
the side camera may include
a lower camera (C3) disposed under the bottom of the crimp terminal (T) disposed on the terminal set unit,
a prism (25) that is disposed above the lower camera (C3) and under the bottom of the crimp terminal (T) disposed on the terminal set unit, and
reflectors (26) that are disposed on the right and left of the prism (25), receive optical images of diagonally-downward right and left side surfaces of the crimp terminal (T) disposed on the terminal set unit at diagonally-downward right and left positions of the crimp terminal (T), and cause the received optical images to be incident to a lens of the lower camera (C3) through the prism (25).

According to the appearance inspection device of a crimp terminal with the configuration in [4] above, it is possible to observe the states of the diagonally-lower right and left side surfaces of the crimp terminal by the side camera, and thus it is possible to observe the deformation state of a stabilizer that protrudes downward to both right and left lower surfaces of the crimp terminal. Accordingly, it is possible to effectively observe the deformation in a right-left direction in which the stabilizer is bent inward or outward. In addition, it is possible to collectively acquire images of both right and left side surfaces of the crimp terminal with one camera, and thus equipment cost is reduced.

[5] In the appearance inspection device of a crimp terminal,
a front camera (C2) that captures an image of a front of the crimp terminal (T) disposed on the terminal set unit may further be provided as the camera.

According to the appearance inspection device of a crimp terminal with the configuration in [5] above, it is possible to observe the inclination of the crimp terminal disposed on the terminal set unit by the front camera. Thus, it is possible to correct the brightness of the image captured by, for example, the upper camera or the side camera, in accordance with the degree of the inclination of the crimp terminal.

According to the present invention, since the gradation light source is reflected on a camera image, as a reflected image on the surface of the crimp terminal, when the crimp terminal is deformed, it is possible to detect the deformation state of the crimp terminal by the change of the brightness of the gradation light source, which is reflected as the reflected image.

What is claimed is:

1. An appearance inspection device of a crimp terminal, which inspects an appearance by capturing an image of the appearance while applying illumination light onto a crimp terminal crimped on a tip of an electric wire, the device comprising:
a terminal set unit that is set at a fixed position of an image capturing space;
an illumination unit for applying illumination light onto the crimp terminal disposed on the terminal set unit in a predetermined direction; and
a camera that captures an image of the crimp terminal disposed on the terminal set unit in a predetermined direction,
wherein the illumination unit includes a planar gradation light source having a brightness that gradually changes from one side on an illumination surface toward another side,
wherein the camera is disposed at a position at which the planar gradation light source appears, as a reflected image on a surface of the crimp terminal, on an image obtained by the camera capturing the image of the crimp terminal,
wherein the terminal set unit is set at a center of an image capturing space of the camera, and the crimp terminal is inserted and set at a posture at which a front end of the crimp terminal is directed toward a front, an upper surface of an electric-wire caulked portion of the crimp terminal is directed upward, and right and left side surfaces of the crimp terminal are directed toward right and left sides,
wherein the camera comprises an upper camera that is disposed over the top of the terminal set unit and captures the image of the crimp terminal disposed on the terminal set unit, from the top is provided as the camera,
wherein the planar gradation light source includes right and left gradation light sources disposed at positions diagonally above and, respectively, on the right and left sides to avoid a top of the terminal set unit as an image capturing optical path of the camera, at a posture at which a flat illumination surface is parallel to an axial direction of the crimp terminal, and
wherein a gradation direction in each of the right and left gradation light sources is set such that the brightness of the illumination surface in each of the right and left gradation light sources gradually changes in a right-left direction while the brightness in a direction parallel to the axial direction of the crimp terminal is maintained to have a predetermined value.

2. The appearance inspection device of a crimp terminal according to claim 1,
wherein the right and left gradation light sources include
flat light sources disposed downward for the illumination surface on right and left sides of the top of the terminal set unit, and
light diffusion plates that are disposed such that a flat surface is directed in the direction parallel to the axial direction of the crimp terminal disposed on the terminal set unit, under the flat light source, are inclined downward as they extend farther to the right and left from a position closest to the top of the terminal set unit, and transmit light from the flat light source while diffusing the light, and
the light diffusion plates each function as a gradation illumination surface having brightness that changes depending on a change in distance from the flat light source in the right-left direction.

3. The appearance inspection device of a crimp terminal according to claim 1,
wherein a side camera that captures images of right and left side surfaces of the crimp terminal disposed on the terminal set unit from a diagonally-lower portion is further provided as the camera,
the side camera includes
a lower camera disposed under a bottom of the crimp terminal disposed on the terminal set unit,
a prism that is disposed above the lower camera and under the bottom of the crimp terminal disposed on the terminal set unit, and
reflectors that are disposed on the right and left of the prism, receive optical images of diagonally-downward right and left side surfaces of the crimp terminal disposed on the terminal set unit at diagonally-downward right and left positions of the crimp terminal, and cause the received optical images to be incident to a lens of the lower camera through the prism.

4. The appearance inspection device of a crimp terminal according to claim 1,
wherein the camera further comprises a front camera that captures an image of a front of the crimp terminal disposed on the terminal set unit.

* * * * *